United States Patent
Goldman et al.

(10) Patent No.: US 10,936,550 B2
(45) Date of Patent: *Mar. 2, 2021

(54) SYNCHRONIZING DIFFERENT REPRESENTATIONS OF CONTENT

(71) Applicant: Adobe Inc., San Jose, CA (US)

(72) Inventors: Oliver I. Goldman, Seattle, WA (US); Roey F. Horns, Seattle, WA (US); Habib Khalfallah, Bellevue, WA (US); Julian R. Wixson, Portland, OR (US)

(73) Assignee: Adobe Inc., San Jose, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/372,193

(22) Filed: Apr. 1, 2019

(65) Prior Publication Data
US 2019/0227991 A1    Jul. 25, 2019

Related U.S. Application Data

(63) Continuation of application No. 14/550,769, filed on Nov. 21, 2014, now Pat. No. 10,268,698.

(51) Int. Cl.
*G06F 16/178* (2019.01)
*G06F 16/27* (2019.01)
*G06F 16/25* (2019.01)

(52) U.S. Cl.
CPC ........ *G06F 16/178* (2019.01); *G06F 16/1794* (2019.01); *G06F 16/258* (2019.01); *G06F 16/27* (2019.01)

(58) Field of Classification Search
CPC .. G06F 16/178; G06F 16/1794; G06F 16/258; G06F 16/27
See application file for complete search history.

(56) References Cited

U.S. PATENT DOCUMENTS

| | | | |
|---|---|---|---|
| 7,386,789 B2 * | 6/2008 | Chao | G06F 40/166 715/239 |
| 10,268,698 B2 | 4/2019 | Goldman et al. | |
| (Continued) | | | |

OTHER PUBLICATIONS

"Final Office Action", U.S. Appl. No. 14/550,769, dated Nov. 14, 2017, 48 pages.

(Continued)

*Primary Examiner* — David T. Brooks
(74) *Attorney, Agent, or Firm* — FIG. 1 Patents

(57) ABSTRACT

Two different representations of content are maintained, at least one of which is a composite representation of the content. The composite representation is multiple different components, each component stored as a separate file and each component including some of the data of the content. The composite representation also includes a manifest that identifies the various components. Different devices can edit the content, and access to the content is coordinated via a synchronization system. The synchronization system manages generation of one or more representations of the content. The synchronization system also manages synchronization of the different representations of the content, allowing changes made on various different computing devices to be reflected in the different representations of the content, and managing situations in which different computing devices may attempt to change the content concurrently.

20 Claims, 7 Drawing Sheets

(56) References Cited

U.S. PATENT DOCUMENTS

| | | | |
|---|---|---|---|
| 2003/0069881 A1* | 4/2003 | Huttunen | G06F 16/986 |
| 2003/0182450 A1* | 9/2003 | Ong | G06F 16/93 709/246 |
| 2003/0200207 A1* | 10/2003 | Dickinson | G06F 8/658 |
| 2003/0202212 A1 | 10/2003 | Burgess | |
| 2004/0267831 A1 | 12/2004 | Wong et al. | |
| 2006/0230030 A1* | 10/2006 | Volpa | G06F 16/9577 |
| 2007/0050428 A1 | 3/2007 | Anantharaman et al. | |
| 2008/0172649 A1 | 7/2008 | Bisso et al. | |
| 2010/0121818 A1 | 5/2010 | Sun et al. | |
| 2011/0276657 A1* | 11/2011 | LeBlanc | H04L 67/26 709/219 |
| 2012/0185759 A1* | 7/2012 | Balinsky | G06Q 10/103 715/209 |
| 2012/0233228 A1* | 9/2012 | Barton | G06F 16/178 707/827 |
| 2013/0103849 A1 | 4/2013 | Mao et al. | |
| 2013/0335789 A1 | 12/2013 | Kimura | |
| 2014/0053227 A1* | 2/2014 | Ruppin | H04L 67/06 726/1 |
| 2014/0098850 A1 | 4/2014 | Wolfram et al. | |
| 2014/0250066 A1 | 9/2014 | Calkowski et al. | |
| 2014/0280403 A1* | 9/2014 | Swansegar | G06F 16/9577 707/827 |
| 2014/0304577 A1 | 10/2014 | St. Pierre et al. | |
| 2016/0147802 A1 | 5/2016 | Goldman et al. | |
| 2016/0335789 A1* | 11/2016 | Zhang | G06T 7/194 |

OTHER PUBLICATIONS

"First Action Interview Office Action", U.S. Appl. No. 14/550,769, dated May 17, 2017, 6 pages.

"Non-Final Office Action", U.S. Appl. No. 14/550,769, dated Jun. 15, 2018, 40 pages.

"Notice of Allowance", U.S. Appl. No. 14/550,769, dated Dec. 5, 2018, 10 pages.

"Pre-Interview Communication", U.S. Appl. No. 14/550,769, dated Apr. 3, 2017, 6 pages.

* cited by examiner

SYNCHRONIZING DIFFERENT REPRESENTATIONS OF CONTENT

CLAIM OF PRIORITY

This application is a continuation of and claims priority to U.S. patent application Ser. No. 14/550,769, filed Nov. 21, 2014, entitled "Synchronizing Different Representations of Content", the entire disclosure of which is hereby incorporated by reference herein in its entirety.

BACKGROUND

As computing technology has advanced and computers have become increasingly commonplace, people have come to use their computers in a variety of different manners. One such use is editing images or other content on their computers. While users may enjoy the ability to edit content on their computers, such editing is not without its problems. One such problem is that content can sometimes be very large in size, leading to situations in which some computers process the content very slowly or cannot process the content at all, leading to user frustration with their devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a request for one or more components of multiple components of a first representation of content is received from a computing device. The first representation of the content comprises a composite representation of the content that includes the multiple components and a manifest identifying the multiple components. A revision identifier identifying the first representation of the content is recorded, the first representation of the content and a second representation of the content being different representations of the content. Based on the second representation of the content, the first representation of the content is generated, and a check is made as to whether the revision identifier identifying the second representation of the content changed during the generating of the first representation of the content. In response to the revision identifier remaining unchanged during the generating, the manifest is saved and the one or more components are returned to the computing device.

In accordance with one or more aspects, a request including one or more modified components of a first representation of content is received from a computing device. The first representation of content includes multiple components and a manifest identifying the multiple components. A second representation of the content is re-constituted based on the one or more modified components, the first representation of the content and the second representation of the content being different representations of the content. A check as to whether the second representation of the content has been modified since the first representation of the content was last generated is made. A previous version of the second representation of the content is replaced with the re-constituted second representation of the content only in response to determining that the second representation of the content has not been modified since the first representation of the content was last generated. A check as to whether the manifest has been modified during the re-constituting of the second representation of the content is also made. The first representation of the content is updated to include the manifest only in response to determining that the manifest has not been modified during the re-constituting of the second representation of the content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Synchronizing different representations of content is discussed herein. A representation of content refers to a manner in which the content is stored, including a number of files used to store the content and the data stored in those one or more files. Two representations of content are maintained, such as a single-file representation of the content and a composite representation of the content. The single-file representation of the content is a single file that can be very large in size, such as on the order of Gigabytes, tens of Gigabytes, or more of data. The composite representation of the content is multiple different components, each stored as a separate file, and each including some of the data of the content. The composite representation also includes a manifest that identifies the various components. The components are typically files that are smaller in size, such as on the order of tens or hundreds of Megabytes of data. Alternatively, the two representations of content can be two different composite representations of the content (e.g., with different components including different data).

These different representations allow the content to be edited on machines with different levels of resources (e.g., processing power, memory space, etc.). Computing devices with large amounts of resources (such as desktop computing devices) are able to manage editing of one representation of the content (e.g., the single-file representation of the content). However, computing devices with smaller amounts of resources (e.g., mobile devices such as smart phones or tablet computers) typically do not have the resources to manage editing of that representation of the content, and thus another representation of the content (e.g., the composite representation of the content) is used by such mobile devices, allowing the mobile devices to obtain and operate on the components of the content they desire.

The different devices editing content coordinate access to the content via a synchronization system. The synchronization system manages generation of one or more representations of the content. The synchronization system also manages synchronization of the different representations of the content, allowing changes made on various different computing devices to be reflected in the different representations of the content, and managing situations in which different computing devices may attempt to change the content concurrently.

Figure 1:
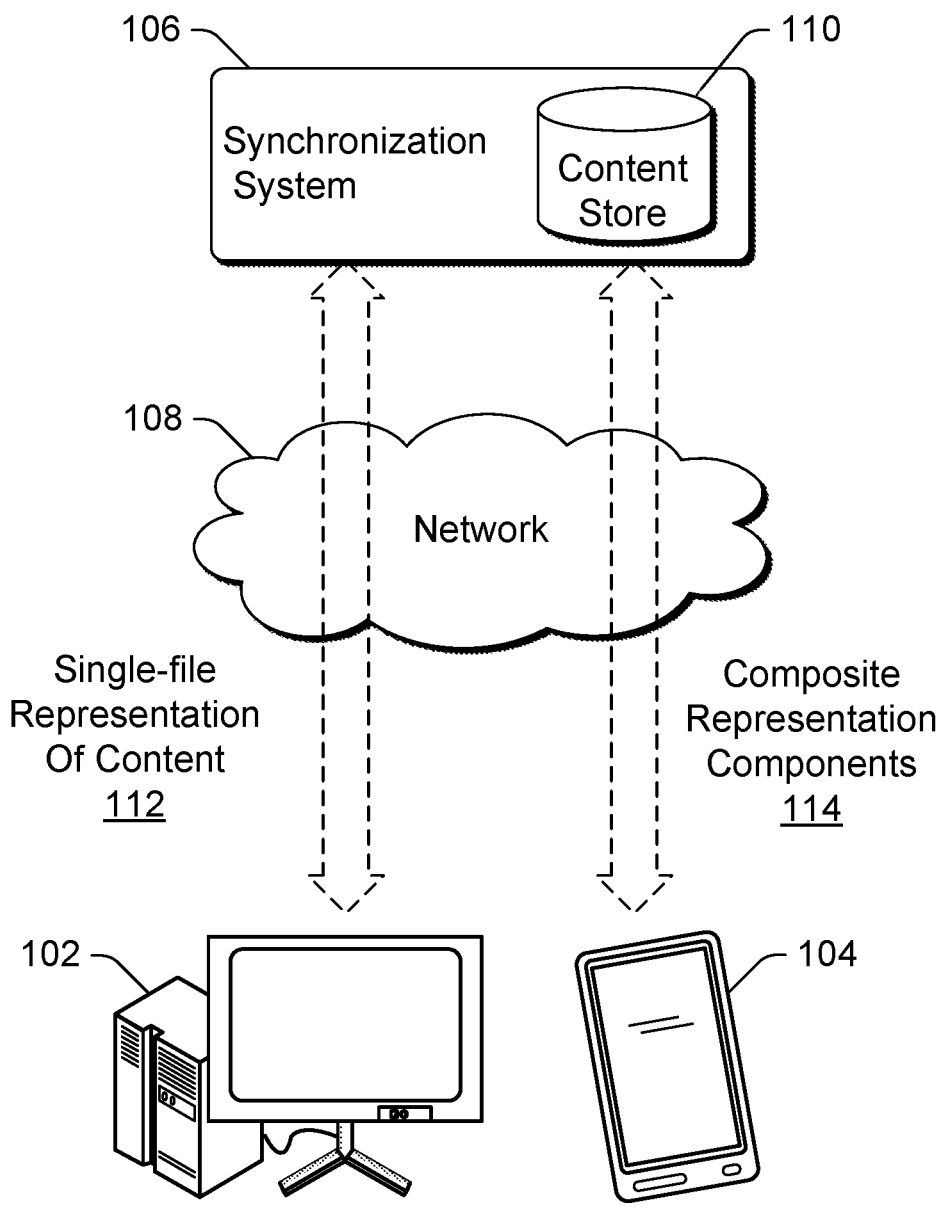
FIG. 1 illustrates an example system implementing the synchronizing different representations of content in accordance with one or more embodiments.

FIG. 1 illustrates an example system 100 implementing the synchronizing different representations of content in accordance with one or more embodiments. The system 100 includes a full-resource or large-resource computing device 102 with substantial memory and processor resources. The full-resource computing device 102 can be any of a variety of different types of computing devices, such as a desktop computer, a server computer, a laptop computer, a game console, and so forth. The system 100 also includes a low-resource device 104 with limited memory and/or processing resources. The low-resource computing device 104 can be any of a variety of different types of computing devices, such as a netbook computer, a tablet or notepad computer, a mobile station, an entertainment appliance, a set-top box communicatively coupled to a display device, a television or other display device, a cellular or other wireless phone (e.g., a smart phone), a handheld game console, an automotive computer, and so forth.

The computing devices 102 and 104 each communicate with a synchronization system 106 via a network 108. The synchronization system 106 is made up of any of a variety of different types of computing devices, such as any one or more of the types of devices discussed with reference to computing devices 102 and 104. The synchronization system 106 is typically made up of one or more full-resource computing devices. The network 108 can be any of a variety of different networks, such as the Internet, a local area network (LAN), a phone network (e.g., a cellular network), an intranet, other public and/or proprietary networks, combinations thereof, and so forth.

The synchronization system 106 includes a content store 110 that stores multiple different representations of content. In one or more embodiments, these representations include a single-file representation of the content and a composite representation of the content. A copy of a single-file representation 112 of the content is communicated from the synchronization system 106 to the full-resource computing device 102, allowing the full-resource computing device 102 to edit the content using the single-file representation of the content, and return a copy of the edited content to the synchronization system 106. Copies of individual components 114 of a composite representation of the content are communicated from the synchronization system 106 to the low-resource computing device 104, allowing the low-resource computing device 104 to edit the content using the composite representation of the content, and return copies of the modified components to the synchronization system 106. The synchronization system 106 manages synchronizing changes to the different representations of the content made by the computing devices 102 and 104 as discussed in more detail below.

Alternatively, these different representations of content can include different composite representations of the content. These different composite representations can include, for example, different components for different types of computing devices. For example, one composite representation (representation A) of the content may include more components than another composite representation (representation B), and representation A can be used by full-resource computing devices and representation B can be used by low-resource computing devices.

Reference is made herein to the full-resource and low-resource computing devices referring to the memory and/or processing resources of the computing devices. The full-resource and low-resource computing devices can also refer to the bandwidth or availability of a communication channel between a computing device and the synchronization system 106. For example, a communication channel may have low bandwidth (e.g., capable of transferring 0.5-2 Megabytes per second), or may be desired by a user of the computing device to be low usage (e.g., due to a financial cost associated with transferring data over the communication channel). A computing device communicating via a communication channel having low bandwidth or low desired usage can also be referred to as a low-resource device (regardless of the memory and/or processing resources of the computing device).

Figure 2:
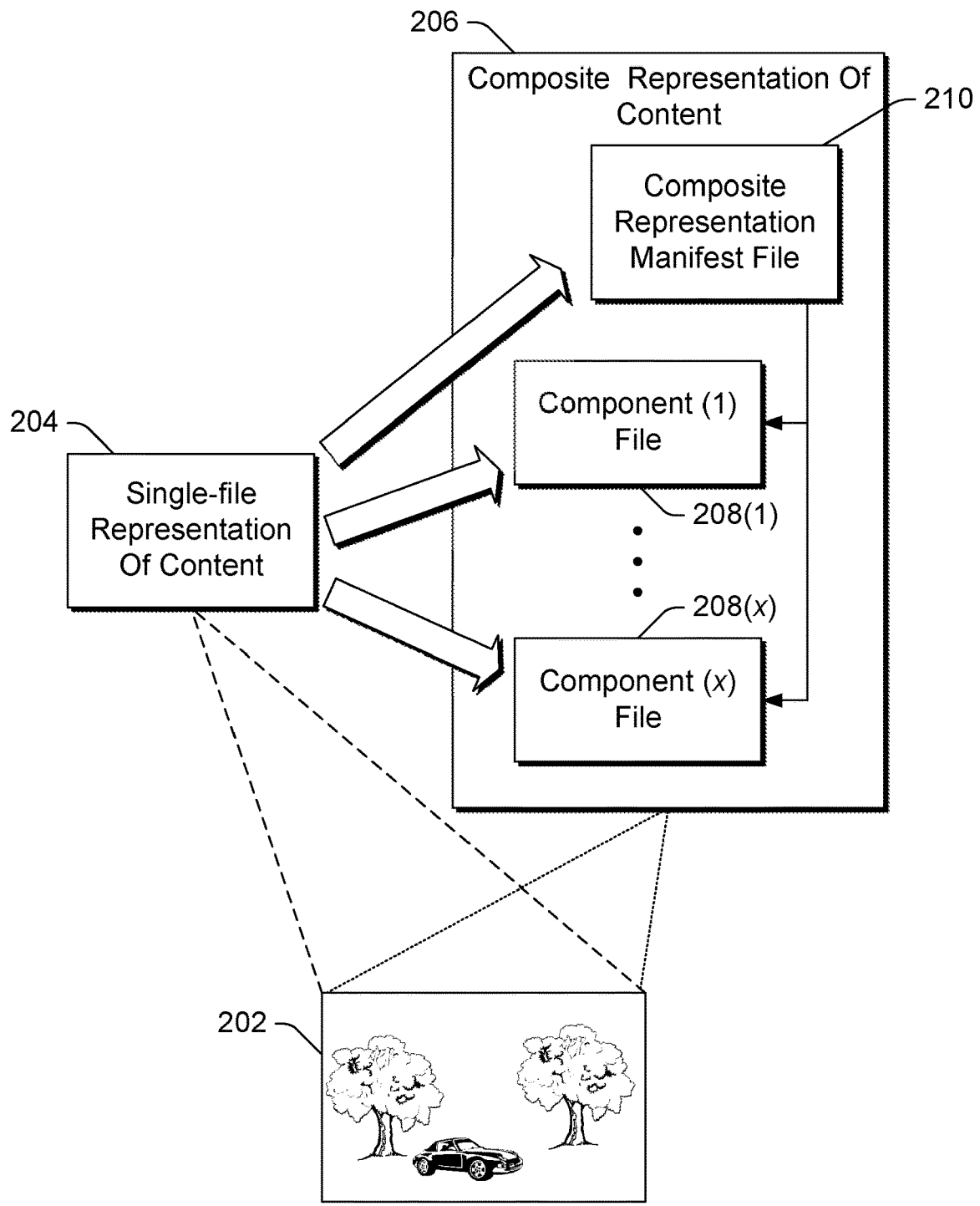
FIG. 2 illustrates an example of different representations of content in accordance with one or more embodiments.

FIG. 2 illustrates an example 200 of different representations of content in accordance with one or more embodiments. The content can be any of a variety of different types of content, such as image or other drawing content, audio content, video content, text content, combinations thereof, and so forth. In the example 200, content 202 in the form of an image or drawing is shown. The example 200 includes a single-file representation 204 of the content 202 and a composite representation 206 of the content 202. The single-file representation 204 of the content 202 is a single file that includes the data of the content 202.

The composite representation 206 of the content 202 is a combination of multiple files, including multiple (x) component files 208(1), . . . , 208(x), and a composite representation manifest file 210. The manifest file 210 identifies each of the component files 208 included in the composite representation 206. The component files 208 can be identified in different manners, such as by including in the manifest file 210 a file name of each of the component files 208.

The composite representation 206 is generated by transforming the single-file representation 204 into multiple components, and storing each component as a component file 208. The transformation can be performed in any of a variety of different manners depending on the type of content 202. For example, image or drawing content 202 can be created or edited using multiple different layers. The data for each of these different layers is stored in the single-file representation 204. However, the data for these different layers is transformed to a different component for the composite representation 206, each of the different component files 208 storing the data for a different one or more of the multiple layers.

By way of another example, video content can be made up of multiple frames, and can be created or edited using multiple different layers (that apply to one or more frames). Video content can be transformed by storing data for different layers and/or different video frames as separate component files 208. By way of yet another example, audio content can be made up of multiple audio segments (e.g., segments having some duration of time), and can be created or edited using multiple different layers (that apply to one or more audio segments). Audio content can be transformed by storing data for different layers and/or different audio segments as separate component files 208.

Figure 3:
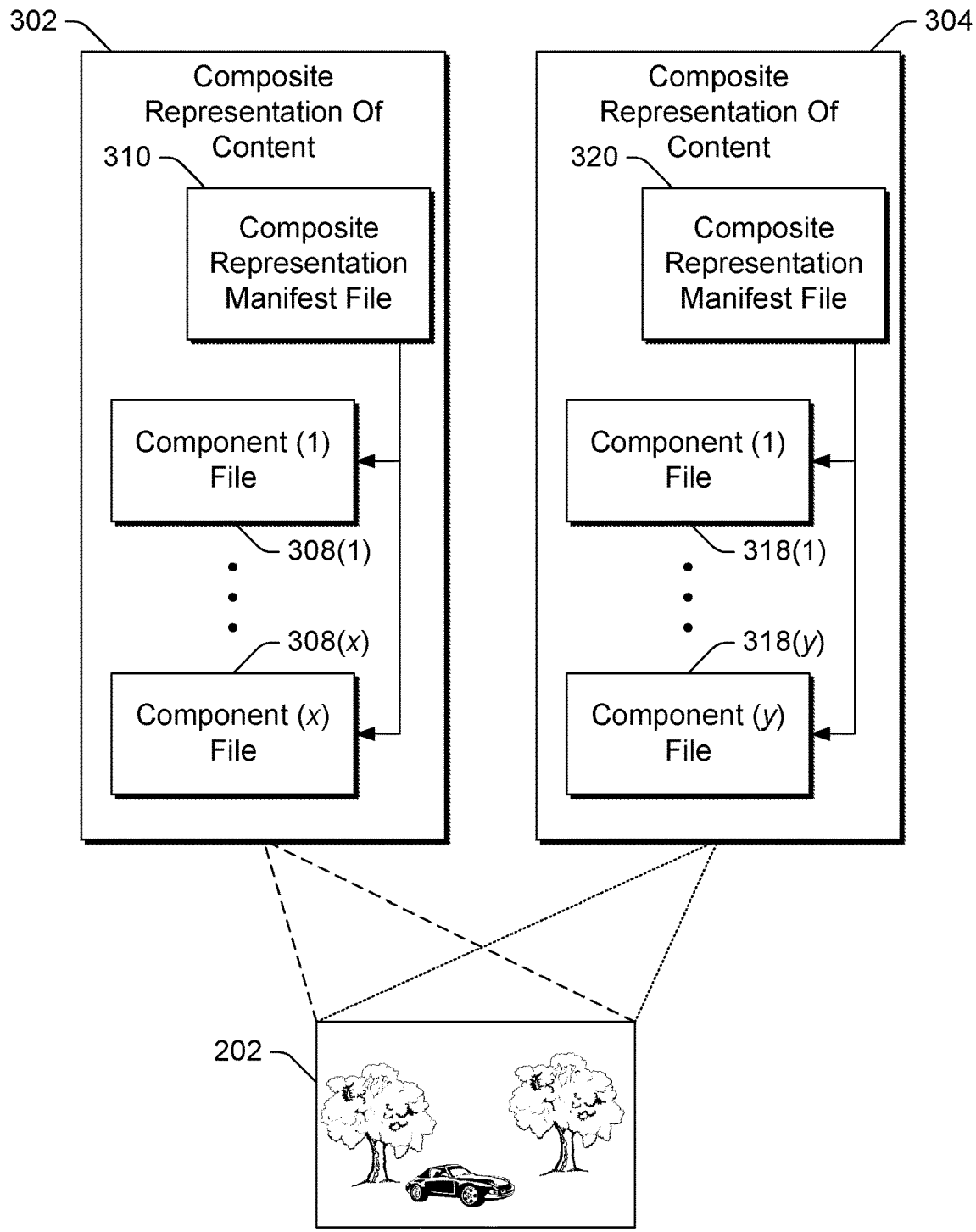
FIG. 3 illustrates another example of different representations of content in accordance with one or more embodiments.

FIG. 3 illustrates an example 300 of different representations of content in accordance with one or more embodiments. In the example 300, content 202 in the form of an image or drawing is shown, although the content can be any of a variety of different types of content as discussed above. The example 300 includes two composite representations of the content: composite representation 302 of the content 202 and composite representation 304 of the content 202.

The composite representation 302 of the content 202 is a combination of multiple files, including multiple (x) component files 308(1), . . . , 308(x), and a composite representation manifest file 310. The manifest file 310 identifies each of the component files 308 included in the composite representation 302. The component files 308 can be identified in different manners, such as by including in the manifest file 310 a file name of each of the component files 308.

The composite representation 304 of the content 202 is a combination of multiple files, including multiple (y) component files 318(1), . . . , 318(y), and a composite representation manifest file 320. The manifest file 320 identifies each of the component files 318 included in the composite representation 304. The component files 318 can be identified in different manners, such as by including in the manifest file 320 a file name of each of the component files 318. The values of x and y can be the same or different, so the number of component files 308 in the composite representation 302 can be the same as or different than the number of component files 318 in the composite representation 304.

The different composite representations 302 and 304 of the content 202 can be generated in different manners, based on programs that use the content 202. For example, an image editing program may have two versions—one version for full-resource computing devices and another version for low-resource devices. The composite representation 302 can include all of the data for the content 202, and the composite representation 302 can be used by full-resource computing devices. The composite representation 304 can include less than all of the data for the content 202 (e.g., data to allow operation of the majority of editing actions users typically desire to perform on a low-resource device, but not data to allow operation for all of the editing actions users can perform on a full-resource device), and the composite representation 304 can be used by low-resource computing devices.

The composite representation 304 is generated by transforming the composite representation 302 into the appropriate multiple components, and storing each component as a component file 318. The transformation can be performed in any of a variety of different manners depending on the type of content 202 and the programs that use the content 202. For example, transforming the composite representation 302 can include excluding from the composite representation 304 components that support functionality not supported by low-resource devices.

Although two different representations of content are illustrated in each of FIGS. 2 and 3, it should be noted that the techniques discussed herein are not limited to only two representations of content. Rather, the techniques discussed herein can be used analogously to synchronize any number of different representations of content.

Figure 4:
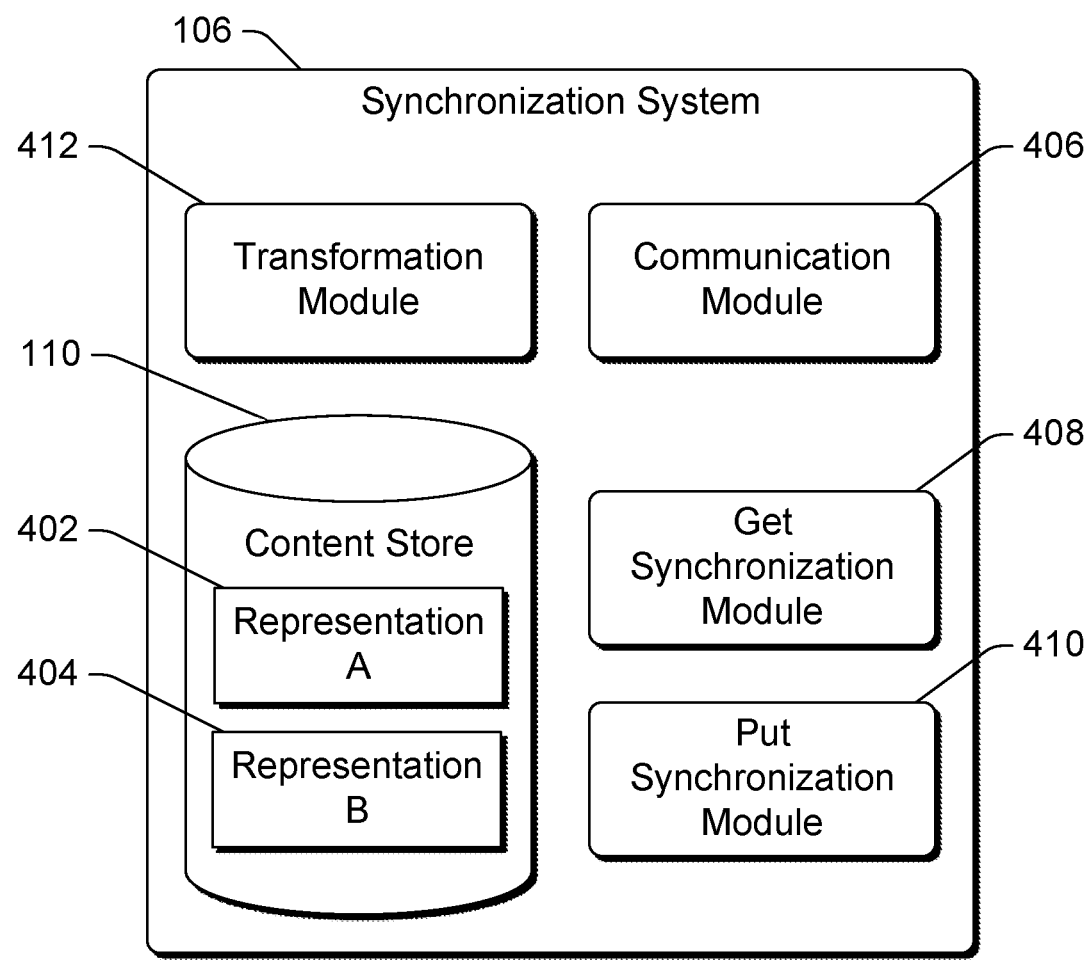
FIG. 4 illustrates an example synchronization system in accordance with one or more embodiments.

FIG. 4 illustrates an example synchronization system 106 in accordance with one or more embodiments. The synchronization system 106 includes the content store 110, a communication module 406, a get synchronization module 408, a put synchronization module 410, and a transformation module 412. Although particular functionality is discussed herein with reference to particular modules, it should be noted that the functionality of individual modules discussed herein can be separated into multiple modules, and/or at least some functionality of multiple modules discussed herein can be combined into a single module.

The content store 110 stores two representations of content, illustrated as representation A 402 and representation B 404. In one or more embodiments, representation A 402 is a single-file representation of the content (e.g., a single-file representation 204 of FIG. 2) and representation B 404 is a composite representation of the content (e.g., a composite representation 206 of FIG. 2). Alternatively, representation A 402 is a composite representation of the content (e.g., a composite representation 302 of FIG. 3) and representation B 404 is a composite representation of the content (e.g., a composite representation 304 of FIG. 3). Although only two representations 402 and 404 are illustrated in FIG. 4, it should be noted that the content store 110 can store multiple representations for each of multiple different contents.

The communication module 406 manages communication between the synchronization system 106 and various computing devices (e.g., computing devices 102 and 104 of FIG. 1). This communication includes sending representations (or components of representations) of content to computing devices, receiving representations (or components of representations) of content from computing devices, receiving requests for content from computing devices, and so forth.

The get synchronization module 408 manages the generation of composite representations of content. The get synchronization module 408 also facilitates maintaining synchronization across the different representations of the content in response to requests for components of the composite representation (also referred to as get requests or operations). In one or more embodiments, the get synchronization module 408 exposes an interface (e.g., an application programming interface (API)) that is invoked by a computing device (e.g., computing device 104 of FIG. 1) in order to obtain one or more components of a composite representation of content. The interface can include various parameters, such as an identification of the particular content, an indication of which components of the content are desired, and so forth.

The put synchronization module 410 manages the re-constitution or re-generation of one representation of content (e.g., a single-file representation of content) based on received components of another representation of content (e.g., a composite representation of content). Components of representation B of the content can be modified by a low-resource device and the modified components provided to the put synchronization module 410. The put synchronization module 410 manages re-constitution of the representation A of the content to include these modified components. The put synchronization module 410 also facilitates maintaining synchronization across the different representations of the content in response to receipt of components of the composite representation (also referred to as put requests or operations).

In one or more embodiments, the put synchronization module 410 exposes an interface (e.g., an API) that is invoked by a computing device (e.g., computing device 104 of FIG. 1) in order to provide one or more components of a composite representation of content to the synchronization system 106. The interface can include various parameters, such as an identification of the particular content, the modified components of the content, and so forth.

The transformation module 412 manages transformation of one representation of content into another representation of the content. This transformation can be performed in various manners as discussed above. The files generated by the transformation module 412 are saved in the content store 110.

The get synchronization module 408 and the put synchronization module 410 facilitate maintaining synchronization across the different representations of the content using an optimistic concurrency control mechanism. Generally, the optimistic concurrency control mechanism allows the synchronization system 106 to proceed with processing requests (e.g., get and put operations) from computing devices assuming that there is no synchronization problem with performing the requests, and then verifies that no such synchronization problem in fact occurred. This allows the synchronization system 106 to avoid creating, clearing, and otherwise managing locks on files or other data.

The synchronization system 106 also uses identifiers of versions of files, which can be referred to as revision identifiers. A revision identifier allows different files to be distinguished from one another, and different versions of a file to be distinguished from one another. Each time a change is made to a file and the file is saved, the saved filed is a new version of the file and the revision identifier changes. The revision identifier can be generated in any of a variety of different manners that allow different versions of the file to be identified. For example, the revision identifier can be generated by applying a hash function to the file (e.g., a cryptographic hash function, such as any of the Secure Hash Algorithm (SHA) functions, such as SHA-1, SHA-2, or SHA-3). In one or more embodiments, the revision identifier is an entity tag, although other identifiers can alternatively be used.

The revision identifiers allow the synchronization system 106 to verify whether a change has occurred to a file over some time span. For example, components of a composite representation can be provided to a computing device 104, which may modify the components and return the modified components to the synchronization system 106. The synchronization system 106 can determine whether the single-file representation of the content was changed while the computing device 104 had the components by comparing the revision identifier of the single-file representation at the time the components were sent to the computing device 104 to the revision identifier of the single-file representation at the time the modified components were received from the computing device 104. If the revision identifiers of the single-file representation at these two times are the same, then the synchronization system 106 knows the single-file representation was not changed while the computing device 104 had the components.

Revision identifiers are assigned to a single-file representation of content (e.g., single-file representation 204 of FIG. 2) as well as the manifest file of a composite representation of content (e.g., manifest file 210 of FIG. 2, manifest file 310 of FIG. 3, manifest file 320 of FIG. 3). The individual component files (e.g., component files 208 of FIG. 2, component files 308 or 318 of FIG. 3) are identified by a manifest file of the composite representation, and thus the individual component files do not need revision identifiers. These revision identifiers and their use are discussed in more detail below.

Figure 5:
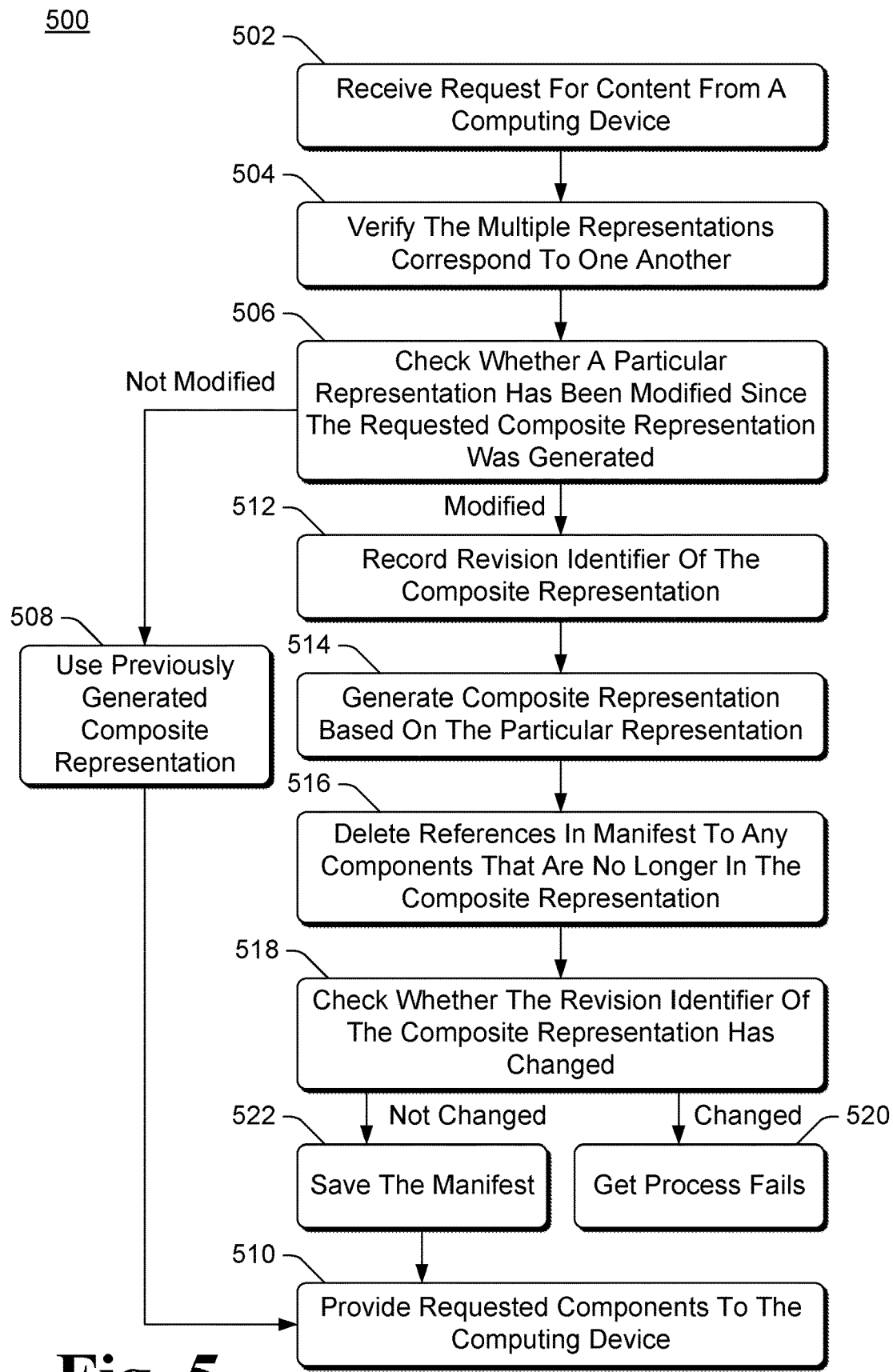
FIG. 5 is a flowchart illustrating an example process for maintaining synchronization of different representations of content during a get operation in accordance with one or more embodiments.

FIG. 5 is a flowchart illustrating an example process 500 for maintaining synchronization of different representations of content during a get operation in accordance with one or more embodiments. Process 500 is carried out by a synchronization system, such as synchronization system 106 of FIG. 1, and can be implemented in software, firmware, hardware, or combinations thereof. Process 500 is shown as a set of acts and is not limited to the order shown for performing the operations of the various acts. Process 500 is an example process for maintaining synchronization of different representations of content during a get operation; additional discussions of maintaining synchronization of different representations of content during a get operation are included herein with reference to different figures.

In process 500, a request for content is received from a computing device (act 502). The request, a get request or a request for a get operation, includes an indication of one representation (e.g., a single-file representation) of the content, an indication of a composite representation of the content, and an indication of one or more components of the composite representation of the content. The program on the computing device is configured with (or otherwise obtains) knowledge of the different components of content in the composite representation, and provides an indication of the components of the composite representation used to perform a desired operation. For example, if a user desires to crop an image, components used to crop the image can be requested by the program, or an indication that image cropping is desired can be provided as part of the request and the synchronization system implementing process 500 can determine the components used to perform the image cropping operation.

The correspondence of the multiple representations of the content to one another is verified (act 504). The synchronization system implementing process 500 verifies that the indicated representations of the content correspond to one another. For example, if the request identifies a single-file representation of the content and a composite representation of the component, the synchronization system verifies that the single-file representation and composite representation are representations of the same content. The synchronization system can maintain an indication of which representations correspond to one another in any of a variety of manners, such as identifiers included in the representations themselves, a separate list or record of corresponding representations, and so forth. If the verification fails, then process 500 ends and the synchronization system performs an appropriate recovery operation (e.g., informing the user that the operation cannot be completed).

A check is made as to whether a particular representation (e.g., the single-file representation, or another composite representation) of the content has been modified since the requested composite representation was generated (act 506). This particular representation of the content is a representation of the content different from the requested composite representation and with which the requested composite representation is synchronized. The composite representation can have been generated by the transformation module of the synchronization system in various manners, as discussed above. In one or more embodiments, this check in act 506 is made based on the revision identifier of the particular representation of the content. The manifest file of the composite representation includes the revision identifier of the particular representation of the content at the time the composite representation was generated. If the revision identifier of the particular representation of the content is the same as the revision identifier in the composite representation, then the particular representation has not been modified since the composite representation was generated. However, if the revision identifier of the particular representation of the content is different than the revision identifier in the composite representation, then the particular representation has been modified since the composite representation was generated.

If the particular representation is unmodified since the composite representation was generated, then the synchronization system uses the previously generated composite representation (act 508), and returns the requested components form the previously generated composite representation to the requesting computing device (act 510). There is no need to re-generate the composite representation because the particular representation has not been modified since generation of the previous composite representation, so the generation is bypassed in act 508. The composite representation could alternatively be re-generated, although the re-generated composite representation would have the same components including the same data as the previously generated composite representation.

However, if the particular representation has been modified since generation of the previous composite representation, then a revision identifier of the composite representation is recorded (act 512). This record of the revision identifier is used to maintain synchronization between the different representations of content, as discussed in more detail below.

A composite representation of the content is generated based on the particular representation (act 514). The composite representation can be generated by using the previously generated composite representation as a base or starting point, and then modifying (adding to and removing from) the previously generated composite representation as appropriate.

In one or more embodiments, the manifest for the composite representation identifies each component file included in the composite representation. These identifiers can include indications of when the component file was created (e.g., a timestamp) or other identifier of particular versions of the component file (e.g., revision identifiers). The transformation module of the synchronization system generates the composite representation, and for each component the transformation module determines whether the data in component has changed since the previously generated composite representation was generated. If the component has been changed, then the composite representation is changed to include the changed component. However, if the component has not been changed, then the composite representation keeps the previously generated component.

This determination of whether the data in a component has changed since generation of the previous composite representation can be made in any of a variety of different manners, such as by comparing the component in the previously generated composite representation to a newly generated version of the component. If the two components are the same then the data in the component has not changed since generation of the previous composite representation. The component in the previously generated composite representation can be compared to the newly generated version of the component in different manners, such as by generating hash values for each component and determining whether the hash values are the same. The hash values can be generated by applying a hash function to the file (e.g., a cryptographic hash function, such as any of Message-digest (MD) algorithms, such as MD5 or MD4).

Keeping previously generated components that have not been changed in the composite representation can improve performance of the computing devices receiving the components. A computing device can cache or otherwise have local copies of the components due to the user editing or having previously edited the content on the computing device. The computing device can check the manifest of the composite representation, and if the computing device already has a local copy that is the same version as identified in the manifest, the computing device need not re-request the component from the synchronization system. If the component were to be re-generated as part of the composite representation however, the new version of the component would be identified in the manifest, and the computing device would request the component as the computing device knows (based on the manifest) that the computing device does not have the most recent version of the component. Thus, by not re-generating the component that has not been changed, the computing device can avoid the time and bandwidth usage of obtaining a component of which the computing device already has a copy.

Alternatively, each component can be generated and included as part of the composite representation in act 514. In such alternatives, each component is included in the newly generated composite representation, and identified in the manifest of the composite representation, regardless of whether the component has been changed since generation of the previous composite representation.

Additionally, references in the manifest to any components that are no longer in the composite representation are deleted (act 516). Situations can arise in which the particular representation is edited in a manner that results in a particular component no longer being generated. For example, a particular layer may be deleted from a single-file representation of the content, and thus when generating the composite representation a component for that layer is no longer generated. In situations in which the composite representation is generated by modifying the previously generated composite representation, indications of (and any other references to) a component that is no longer generated are deleted from the composite representation.

A check is made as to whether the revision identifier of the composite representation has changed since the composite representation generation began (act 518). This check is made by checking whether the revision identifier as recorded in act 512 is the same as the current revision identifier of the composite representation. If the revision identifier of the composite representation has changed since the composite representation generation began, then process 500 returns to act 512. Situations can arise in which the composite representation of content changes during the composite representation generation of process 500. Given the change, the synchronization system cannot rely on the components in the composite representation generated in acts 514 and 516 accurately reflecting the data in the particular representation. Accordingly, if the revision identifier of the composite representation has changed since the composite representation generation began, then the process 500 fails (act 520). To maintain synchronization across the various computing devices, the manifest for the composite representation being generated is not saved. The process 500 can optionally be repeated in response to another get request.

However, if the revision identifier of the composite representation has not changed since the composite representation generation began, then the manifest for the newly generated composite representation is saved (act 522). The manifest is saved, for example, in the content store 110. The saving of the manifest includes generating a new revision identifier for the manifest, as discussed above. The requested components are also returned to the requesting computing device (act 510).

It should be noted that the generation of the composite representation and the manifest in acts 514 and 516 can be performed using temporary files, and those files are not used by the synchronization system as the current composite representation of the content until the manifest is saved in act 522.

Figure 6:
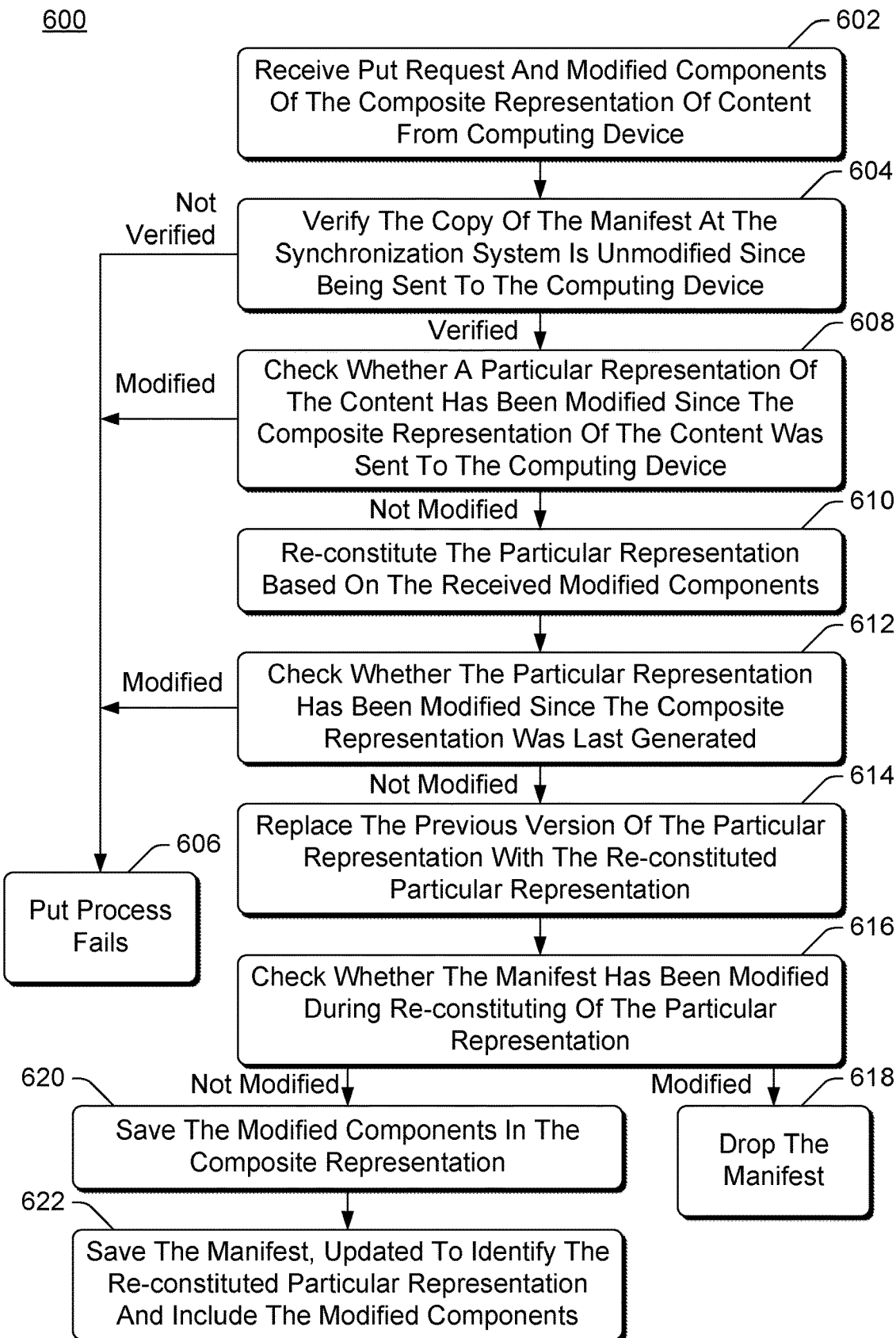
FIG. 6 is a flowchart illustrating an example process for maintaining synchronization of different representations of content during a put operation in accordance with one or more embodiments.

FIG. 6 is a flowchart illustrating an example process 600 for maintaining synchronization of different representations of content during a put operation in accordance with one or more embodiments. Process 600 is carried out by a synchronization system, such as synchronization system 106 of FIG. 1, and can be implemented in software, firmware, hardware, or combinations thereof. Process 600 is shown as a set of acts and is not limited to the order shown for performing the operations of the various acts. Process 600 is an example process for maintaining synchronization of different representations of content during a put operation; additional discussions of maintaining synchronization of different representations of content during a put operation are included herein with reference to different figures.

In process 600, a put request and one or more modified components of a composite representation of content are received from a computing device (act 602). These one or more components are modified, for example, in response to content editing operations performed by a user of the computing device at the computing device.

For the manifest used by the computing device, the copy of the manifest at the synchronization system is verified as being unmodified since being sent to the computing device (act 604). The verification in act 604 refers to the copy of manifest stored at the synchronization system (the manifest in the content store) rather than the copy of the manifest stored at or received from the computing device. This verification is performed based on the revision identifier of the manifest. The put request received in act 602 includes an indication of the revision identifier of the manifest that the computing device has. If the revision identifier of the manifest that the computing device has is the same as the revision identifier of the manifest of the composite representation of the content at the synchronization system, then the copy of the manifest stored at the synchronization system is unmodified since being sent to the computing device. However, if the revision identifier of the manifest that the computing device has is different than the revision identifier of the manifest of the composite representation of the content at the synchronization system, then the copy of the manifest at the synchronization system has been modified since being sent to the computing device. Such a change can occur, for example, if another computing device is also editing components of the composite representation of the content.

If the manifest has been changed since being sent to the computing device, then the process 600 fails (act 606). To maintain synchronization across the various computing devices, the composite representation is not updated to reflect the received modified components. Rather, the computing device performs another get operation (as discussed with reference to FIG. 5) to obtain the current composite representation of the content, and edits are optionally re-made by the user at the computing device. It should be noted that even though the manifest has changed, an individual component may not have changed. The computing device can detect such situations (e.g., based on indications of when the component file was created or other identifiers of particular versions of the component file in the manifest), and if the component has not been changed then repeat the put request (with the revision identifier of the manifest newly received by the computing device).

A check is made as to whether a particular representation (e.g., the single-file representation, or another composite representation) of the content has been modified since the requested composite representation was sent to the computing device (act 608). This particular representation of the content is a representation of the content different from the composite representation and with which the composite representation is synchronized. In one or more embodiments, this check in act 608 is made based on the revision identifier of the particular representation of the content. An indication of the revision identifier of the particular representation of the content at the time the composite representation was previously sent to the computing device is received as part of receiving the put request in act 602 (e.g., the manifest file, which includes the revision identifier, can be received as part of receiving the put request in act 602). If the current revision identifier of the particular representation of the content is the same as the revision identifier in the received manifest file, then the particular representation has not been modified since the composite representation was sent to the computing device. However, if the current revision identifier of the particular representation of the content is different than the revision identifier in the received manifest file, then the particular representation has been modified since the composite representation was sent to the computing device.

If the particular representation has been modified since the composite representation was sent to the computing device, then the process 600 fails (act 606). To maintain synchronization across the various computing devices, the composite representation is not updated to reflect the received modified components. Rather, the computing device performs another get operation (as discussed with reference to FIG. 5) to obtain the current composite representation of the content, and edits are optionally re-made by the user at the computing device.

However, if the particular representation is unmodified since the composite representation was sent to the computing device, the particular representation of the content is re-constituted based on the received modified components (act 610). The particular representation can be re-constituted in various different manners by the transformation module. In one or more embodiments, a new composite representation is generated that includes the received modified components, and then each component in the new composite representation is read in by the transformation module and the new particular representation of the content is generated. For example, all the components of the composite representation can be read in by the transformation module, and a new single-file representation of the content is written out by the transformation module.

Alternatively, the particular representation can be re-constituted in other manners. For example, the transformation module can read in the particular representation of the content, and then modify the particular representation of the content based on the modified components. Any changes to the content reflected in the modified components are thus also reflected in the particular representation of the content.

Situations can arise in which the particular representation of content changes since the composite representation was last generated (e.g., due to user edits at another computing device), including during the re-constituting of act 610. Accordingly, a check is made as to whether the particular representation of the content has been modified since the composite representation was last generated (act 612). This check is made by checking whether the revision identifier indicated in the copy of the manifest stored at the synchronization system is the same as the current revision identifier of the particular representation. If the revision identifier of the particular representation and the revision identifier indicated in the copy of the manifest stored at the synchronization system are different, then the particular representation of the content has been modified since the composite representation was last generated, and the process 600 fails (act 606). To maintain synchronization across the various computing devices, the re-constituted particular representation does not replace the previous version of the particular representation. Rather, the computing device performs another get operation (as discussed with reference to FIG. 5) to obtain the current composite representation of the content, and edits are optionally re-made by the user at the computing device.

However, if the revision identifier of the particular representation and the revision identifier indicated in the copy of the manifest stored at the synchronization system are the same, then the particular representation of the content has not been modified since the composite representation was last generated, and the re-constituted particular representation replaces the previous version of the particular representation (act 614). This replacing includes saving the re-constituted particular representation as the particular representation of the content (e.g., in the content store 110), and generating a new revision identifier for the particular representation of the content, as discussed above.

It should be noted that the generation of the re-constituted particular representation in act 610 can be performed using a temporary file that is not used by the synchronization system as the current particular representation of the content until the re-constituted particular representation replaces the previous version of the particular representation in act 614. Thus, if a modified copy of the particular representation of the content were received from another computing device during the re-constituting of the particular representation in act 610, that modified copy would replace the previous version of the particular representation and would not affect the re-constituted particular representation.

Situations can also arise in which the composite representation of the content changes during the re-constituting of act 610 (e.g., due to user edits at another computing device). Accordingly, a check is made as to whether the manifest has been modified during the re-constituting of the particular representation (act 616). This check is made by checking whether the revision identifier for the manifest as checked prior to starting the re-constituting of act 610 (the revision identifier verified in act 604) is the same as the current revision identifier of the manifest of the composite representation. If the revision identifier of the manifest has changed since the re-constituting of the particular representation began, then the manifest is dropped (act 618). To maintain synchronization across the various computing devices, the particular representation of the content is given priority over the composite representation of the content. Accordingly, if the composite representation and the particular representation of the content are changed, the particular representation of the content gets priority and the composite representation is dropped (e.g., deleted or otherwise ignored). However, the composite representation can be re-generated (e.g., in response to the next get request from a computing device).

However, if the manifest has not changed during the re-constituting of the particular representation, then the modified components in the composite representation of the content are saved (act 620). Ones of the components of the composite representation are replaced with their respective modified components. The manifest is also saved, updated to identify the re-constituted particular representation of the content (act 622). This updating includes saving the revision identifier of the re-constituted particular representation (as generated in act 614) in the manifest. The updating of the manifest (to include the revision identifier of the re-constituted particular representation, and the modified components) includes saving the manifest and generating a new revision identifier for the manifest, as discussed above. The manifest and components of the composite representation are saved, for example, in the content store 110.

The techniques discussed herein support various usage scenarios. Multiple different representations of content, one or more of which may not include data for all of the content, are made available by a synchronization system. A low-resource computing device can obtain components of a composite representation of the content and allow a user of the low-resource computing device to edit the content on the low-resource computing device, even though the low-resource computing device may not be able to edit other representations of the content (e.g., a single-file representation of the content). The low-resource computing device can download only the components of the composite representation that a program running on the low-resource computing device desires to perform actions requested by a user at the low-resource computing device. The low-resource computing device can also be running a smaller program, and need not support all of the content editing capabilities of other programs run on full-resource computing devices.

The synchronization system maintains synchronization across these different representations of content using an optimistic concurrency control mechanism. The synchronization system maintains synchronization across these different representations of content without imposing any sort of synchronization locks on files or forcing two multiple files to be locked together.

It should also be noted that components of the composite representation can be downloaded concurrently (in parallel). In some situations, this downloading of multiple components can be performed faster than downloading of a single file including the multiple components. The downloading of only components desired by the program can also reduce the bandwidth use between the computing device and the synchronization system, due to components not desired by the computing device not being obtained by the computing device.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
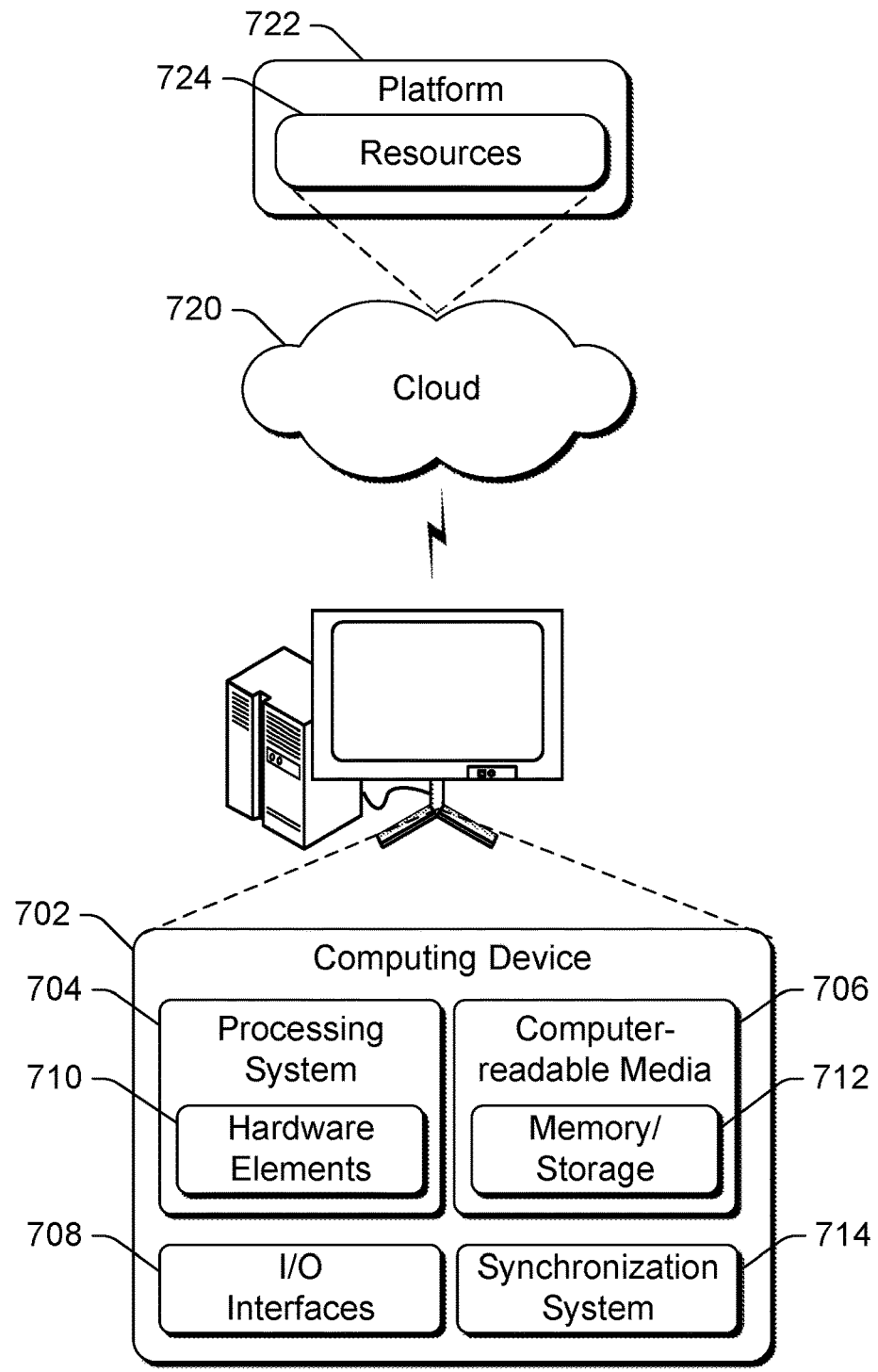
FIG. 7 illustrates an example system that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. This is illustrated through inclusion of the synchronization system 714, which may be configured to synchronization different representations of content as discussed herein. Computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 704 is representative of functionality to perform one or more operations using hardware. Accordingly, processing system 704 is illustrated as including hardware elements 710 that may be configured as processors, functional blocks, and so forth. This may include implementation in hardware as an application specific integrated circuit or other logic device formed using one or more semiconductors. Hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 706 is illustrated as including memory/storage 712. Memory/storage 712 represents memory/storage capacity associated with one or more computer-readable media. Memory/storage component 712 may include volatile media (such as random access memory (RAM)) and/or nonvolatile media (such as read only memory (ROM), Flash memory, optical disks, magnetic disks, and so forth). Memory/storage component 712 may include fixed media (e.g., RAM, ROM, a fixed hard drive, and so on) as well as removable media (e.g., Flash memory, a removable hard drive, an optical disc, and so forth). Computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 702. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. Computing device 702 may be configured to implement particular instructions and/or functions corresponding to the software and/or hardware modules. Accordingly, implementation of a module that is executable by computing device 702 as software may be achieved at least partially in hardware, e.g., through use of computer-readable storage media and/or hardware elements 710 of processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of computing device 702 and are not limited to the specific examples of the techniques described herein. This functionality may also be implemented all or in part through use of a distributed system, such as over a "cloud" 720 via a platform 722 as described below.

Cloud 720 includes and/or is representative of a platform 722 for resources 724. Platform 722 abstracts underlying functionality of hardware (e.g., servers) and software resources of cloud 720. Resources 724 may include applications and/or data that can be utilized while computer processing is executed on servers that are remote from computing device 702. Resources 724 can also include services provided over the Internet and/or through a subscriber network, such as a cellular or Wi-Fi network.

Platform 722 may abstract resources and functions to connect computing device 702 with other computing devices. Platform 722 may also serve to abstract scaling of resources to provide a corresponding level of scale to encountered demand for resources 724 that are implemented via platform 722. Accordingly, in an interconnected device embodiment, implementation of functionality described herein may be distributed throughout system 700. For example, the functionality may be implemented in part on computing device 702 as well as via platform 722 that abstracts the functionality of the cloud 720.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    storing, by a computing device, a single-file representation of content and a composite representation of the content that is different than the single-file representation, the single-file representation including a plurality of layers of the content, the composite representation including:
        a plurality of components including, respectively, different layers of the plurality of layers; and
        a manifest identifying the plurality of components;
    sending, by the computing device, the single-file representation via the network to a different computing device;
    receiving, by the computing device, a modification to a layer of the plurality of layers of the single-file representation from the different computing device;
    synchronizing, by the computing device, the plurality of layers of the composite representation and the plurality of layers of the single-file representation based on the modification;
    receiving, by the computing device, a request for a component including the layer from the plurality of components of the synchronized composite representation from another different computing device;
    sending, by the computing device, the component including the layer from the plurality of components of the synchronized composite representation to the another different computing device responsive to receiving the request.

2. A method as recited in claim 1, wherein the content is an image and the plurality of layers are layers of the image.

3. A method as recited in claim 1, wherein the content is a video and the plurality of layers are layers of the video.

4. A method as recited in claim 1, wherein each component of the plurality of components includes a respective layer of the plurality of layers.

5. A method as recited in claim 4, further comprising receiving, by the computing device, a deletion of another layer of the plurality of layers of the single-file representation from the different computing device, and wherein the synchronizing includes deleting a component including the another layer.

6. A method as recited in claim 1, further comprising: in response to the composite representation being modified since generation of the single-file representation, the synchronizing including generating an updated version of the single-file representation based on the composite representation.

7. A method as recited in claim 1, the synchronizing including:
    using a previous version of the composite representation, including a previous version of the manifest, as a starting point; and
    replacing, for each component that has changed since generation of the previous version of the composite representation, the component in the previous version of the composite representation with the changed component.

8. A method as recited in claim 1, the synchronizing including:
    using a previous version of the composite representation, including a previous version of the manifest, as a starting point; and
    deleting, from the manifest, reference to a component included in the previous version of the composite representation that is not included in the composite representation.

9. A method comprising:
    storing, by a computing device, a single-file representation of content and a composite representation of the content that is different than the single-file representation, the single-file representation including a plurality of layers of the content, the composite representation including:
        a plurality of components including, respectively, different layers of the plurality of layers; and
        a manifest identifying the plurality of components;

receiving, by the computing device, a modification to a component including a layer of the plurality of layers of the composite representation from a different computing device;

synchronizing, by the computing device, the plurality of layers of the composite representation and the plurality of layers of the single-file representation based on the modification;

receiving, by the computing device, a request for the single-file representation from another different computing device; and sending, by the computing device, the synchronized single-file representation including the layer to the another different computing device responsive to receiving the request.

10. A method as recited in claim 9, wherein the content is an image and the plurality of layers are layers of the image.

11. A method as recited in claim 9, wherein the content is a video and the plurality of layers are layers of the video.

12. A method as recited in claim 9, wherein each component of the plurality of components includes a respective layer of the plurality of layers.

13. A method as recited in claim 12, further comprising receiving, by the computing device, a deletion of a component of the plurality of components, and wherein the synchronizing includes deleting a layer included in the component.

14. A method as recited in claim 9, further comprising in response to the single-file representation being modified since generation of the composite representation, the synchronizing including generating an updated version of the composite representation based on the single-file representation.

15. A method as recited in claim 9, the synchronizing including:

using a previous version of the single-file representation as a starting point; and replacing, for each layer that has changed since generation of the previous version of the single-file representation, the layer in the previous version of the single-file representation with the changed layer.

16. A synchronization system implemented on one or more computing devices, the synchronization system comprising:

at least one processor;

a content store that stores a first representation of content and a second representation of the content, the first representation of the content including multiple component files and a manifest identifying the multiple component files, the multiple component files including, respectively, different layers of a plurality of layers of the content, the second representation of the content including the plurality of layers; and a synchronization module that, responsive to execution by the at least one processor, performs operations including:

receiving, from a computing device, a modification to a layer of the plurality of layers of the second representation;

synchronizing the plurality of layers of the first representation and the plurality of layers of the second representation based on the modification;

receiving, from another computing device, a request for one or more components of the multiple components of the first representation; and sending the one or more components of the first representation to the another computing device responsive to receiving the request.

17. A synchronization system as recited in claim 16, wherein the content is an image and the plurality of layers are layers of the image.

18. A synchronization system as recited in claim 16, wherein the content is a video and the plurality of layers are layers of the video.

19. A synchronization system as recited in claim 16, wherein each component of the plurality of components includes a respective layer of the plurality of layers.

20. A synchronization system as recited in claim 19, the operations further comprising receiving a deletion of another layer of the plurality of layers of the second representation from the computing device, and wherein the synchronizing includes deleting a component including the another layer.

* * * * *